(No Model.)

G. OTTO.
GALVANIC BATTERY.

No. 415,975. Patented Nov. 26, 1889.

WITNESSES:
Gustave Dieterich.
T. F. Bourne

INVENTOR
Gustav Otto
BY Briesen, Steele & Knauth
ATTORNEYS.

UNITED STATES PATENT OFFICE.

GUSTAV OTTO, OF JERSEY CITY, NEW JERSEY.

GALVANIC BATTERY.

SPECIFICATION forming part of Letters Patent No. 415,975, dated November 26, 1889.

Application filed August 1, 1889. Serial No. 319,460. (No model.)

*To all whom it may concern:*

Be it known that I, GUSTAV OTTO, of Jersey City, Hudson county, New Jersey, have invented certain new and useful Improvements in Electric Batteries, of which the following is a specification.

The object of my invention is to provide sundry improvements in batteries and battery-cells, whereby a simple, cheap, and portable battery is produced.

The invention consists in the details of improvement and the combinations of parts that will be more fully hereinafter set forth, and then pointed out in the claims.

Reference is to be had to the accompanying drawings, forming part hereof, in which—

Figure 1:
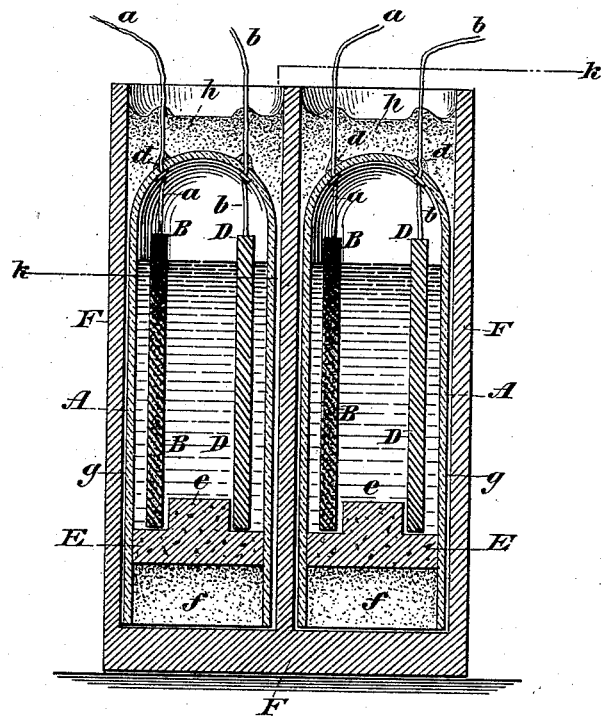
Figure 2:
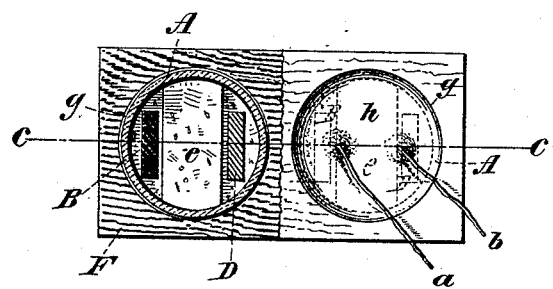

Figure 1 is a vertical cross-section on the line $c\ c$, Fig. 2, through a battery embodying my invention; and Fig. 2 is a horizontal section of the same on the line $k\ k$, Fig. 1.

The letter A in the drawings indicates a battery-cell, which may be made of glass or other suitable material, which cell is shown closed at the top by the material of which the cell is made. The cell A contains suitable electrodes B D, from which wires $a\ b$ extend, which wires are shown passing through the top of the cell, the aperture through which they pass being closed by paraffine or the like $d$; but, if preferred, the material of which the cell A is made can be melted around the wires $a\ b$, so as to make a tight connection. The electrodes B D rest upon a cork or other non-conducting plug or stopper E, that is passed into and secured within the lower end of the cell A. $e$ is a partition between the electrodes B D to keep them separated. It is shown secured to the stopper E. After the electrodes have been fitted in the cell A a suitable liquid is placed therein, whereupon the cork or stopper E is passed into the lower end of the cell to close the same and prevent the escape of the liquid. The cork or stopper E is passed within the cell a short distance, and below the stopper the cell is filled with paraffine or the like $f$, whereby a perfect closure of the cell is produced. By the above construction of cell the same can be perfectly sealed without interfering with the conducting-wires, and a better finish is produced than if the cell were sealed on top, as in the ordinary construction of cells.

In order that the cell above described may be transported without danger of breakage, and to make a compact battery whether the cells are arranged singly or in series, I provide a block of wood or other suitable material F, with one or more cavities $g$, into each of which a cell A can be placed. (See Fig. 1.) The cavity $g$ is of a sufficient depth to wholly inclose the cell A, and in order to securely retain the cell within the cavity $g$, and to prevent any leakage of liquid from the cell, I fill the cavity $g$ above the cell with paraffine or other suitable material $h$. By this means, also, the wires $a\ b$, projecting from the cell A, are kept separated and insulated. The cell being thus securely held and protected on all sides, it can be transported without danger of breakage or leakage.

Having now described my invention, what I claim is—

1. The cell A, having the top closed by the material of which the cell is made, and the lower end closed by an insulating plug or stopper extending into the cell from the lower end and held therein, substantially as described.

2. The cell A, having its top closed by the material of which the cell is made, and the electrodes B D, and conductors $a\ b$, extending from said electrodes through the top of the cell, combined with the insulating plug or stopper E and the partition $e$, substantially as described.

3. The cell A and electrodes B D, combined with the stopper E, extending into the cell from the bottom, which stopper serves to support and also separate the electrodes, substantially as described.

4. The block F, having the cavity $g$, combined with the inverted cell, whose open lower end rests on the bottom of said cavity $g$, substantially as described.

5. The cell A, having its lower end closed by the stopper E and sealed with the substance $f$, combined with the block F, having the cavity $g$, within which the cell is placed, and with the sealing substance $h$ on top of the cell, all arranged substantially as herein shown and described.

GUSTAV OTTO.

Witnesses:
T. F. BOURNE,
JOHN M. SPEER.